United States Patent [19]

Huret

[11] 4,252,029
[45] Feb. 24, 1981

[54] DRIVING WHEEL FOR CYCLE SPEEDOMETERS

[75] Inventor: Roger Henri M. Huret, Nanterre, France

[73] Assignee: Establissements Huret & Fils, Nanterre, France

[21] Appl. No.: 934,173

[22] Filed: Aug. 16, 1978

[30] Foreign Application Priority Data

May 22, 1978 [FR] France ............................ 78 15138

[51] Int. Cl.³ .......................................... F16H 37/00
[52] U.S. Cl. ........................................ 74/15; 73/527;
    474/174; 474/902
[58] Field of Search ............... 280/289 R, 289 D, 296;
    74/12, 15, 230.05, 230.5, DIG. 10, 230.01;
    211/60 R, 49; 138/89, 96 R; 285/DIG. 2, 177;
    220/287, 306; 73/527, 529

[56] References Cited

U.S. PATENT DOCUMENTS

| 1,252,943 | 1/1918 | Polack | 74/15 |
| 1,262,003 | 4/1918 | Bayne | 74/15 |
| 1,267,376 | 5/1918 | Chilson | 74/15 X |
| 1,282,316 | 10/1918 | Tanguary et al. | 74/15 |
| 3,141,567 | 7/1964 | Scheaver | 220/287 |
| 3,850,341 | 11/1974 | Bart | 220/306 |

Primary Examiner—C. J. Husar
Assistant Examiner—Conrad Berman
Attorney, Agent, or Firm—Wolf, Greenfield & Sacks

[57] ABSTRACT

A driving wheel for a cycle speedometer which is adapted to engage a driving belt in communication with the cycle speedometer. The driving wheel is attached to the cycle wheel or wheel block by a plurality of radially located resilient hooks.

9 Claims, 6 Drawing Figures

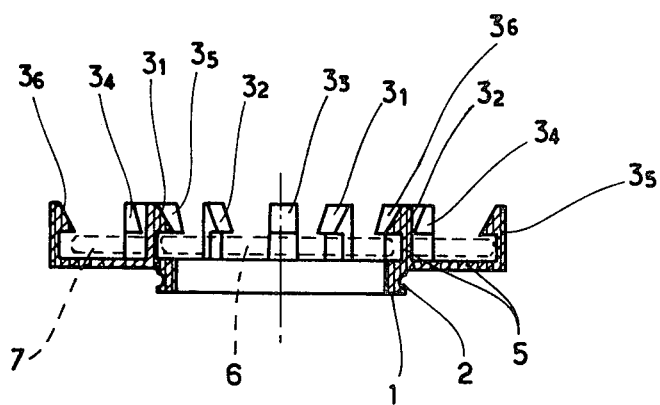
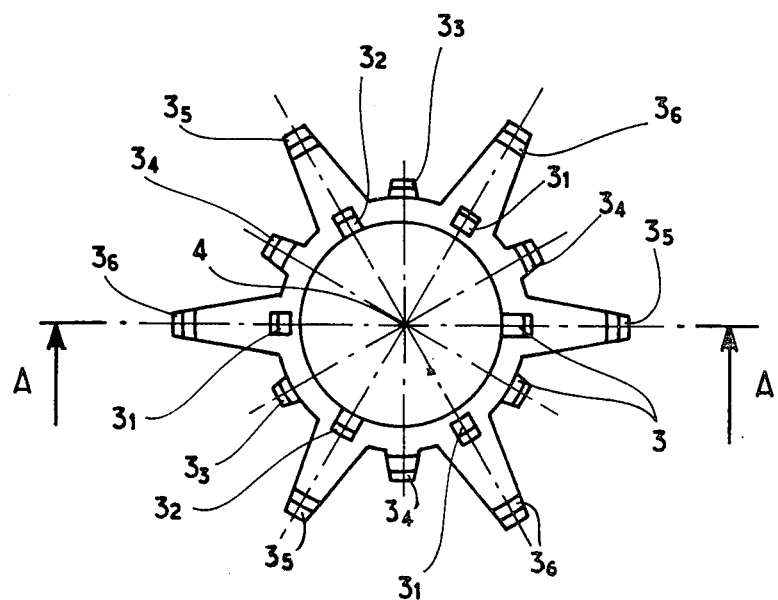

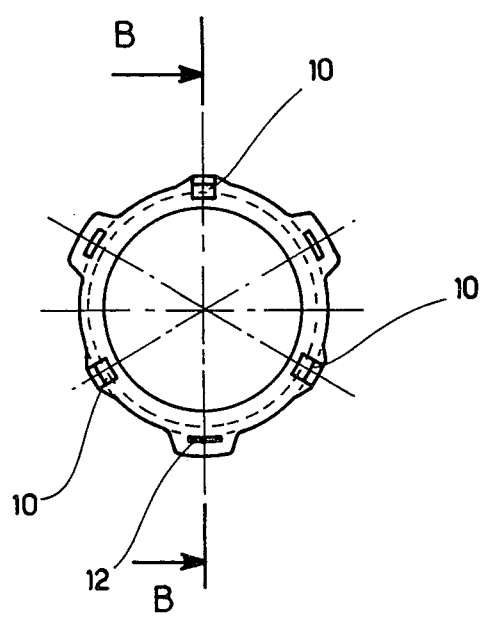
Fig: 3
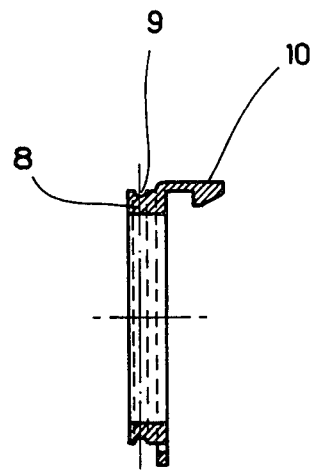
Fig: 4

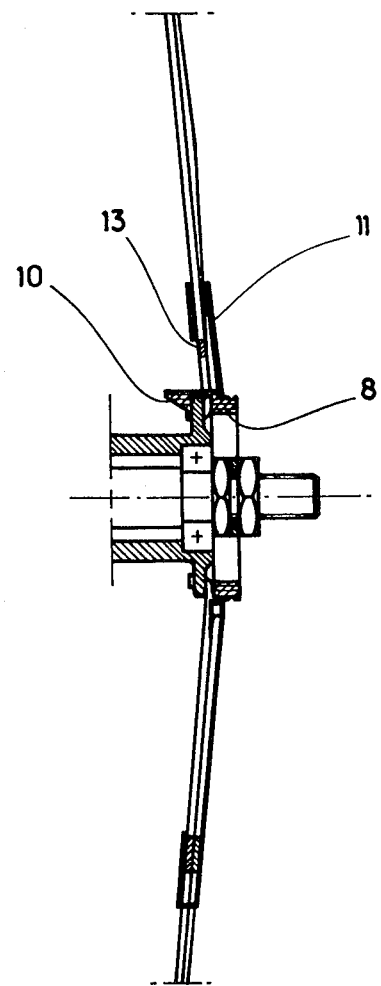
Fig: 6

DRIVING WHEEL FOR CYCLE SPEEDOMETERS

The invention relates to a driving wheel for speedometers on cycles the use of the term speedometer henceforth and in the claims is intended to embrace application of the invention as well to cyclometers.

Speedometers fitted on cycles and, for example, on the fork of a wheel are driven by two types of devices, one of which comprises mechanical assemblies, for example, a pinion and a worm mounted on the axle of the wheel hub and the other a grooved wheel over which passes a taut belt on a pulley provided on the speedometer.

The first of said devices has a complex construction, a relatively high cost price and a significant weight, whilst the second is very infrequently used because it is fixed to one of the blocks of the wheel hub, for example by means of screws, so that each driving wheel must be constructed in such a way that it can be fitted to a specific hub block, whereby the wheel fixing means correspond very precisely as regards type, position and dimensions to those provided on the driving wheel of the speedometer.

The object of the present invention is to obviate these disadvantages and to this end relates to a driving wheel for cycle speedometers comprising a groove for receiving a belt connected to the speedometer, whereby said wheel is characterised in that it is peripherally provided with hooks made from semi-rigid material.

According to another feature of the invention, the wheel is made in one piece with the hooks by moulding plastics material, said hooks being connected to the wheel by tongues.

According to another feature of the invention, the wheel has a plurality of groups of hooks arranged in circles coaxial to the wheel.

According to another feature of the invention, the hooks made from semi-rigid material comprise thin metallic strips hooked to the periphery of the wheel.

The invention is represented in exemplified and non-limitative manner in the attached drawings, wherein show:

FIG. 1 is an elevation of a first embodiment of the driving wheel according to the invention.

FIG. 2 is a section along the line A—A of FIG. 1.

FIG. 3 is an elevation of another embodiment of the driving wheel of the invention.

FIG. 4 is a section along the line B—B of FIG. 3.

FIG. 6 is a section along the line C—C of FIG. 5.

Figure 5:
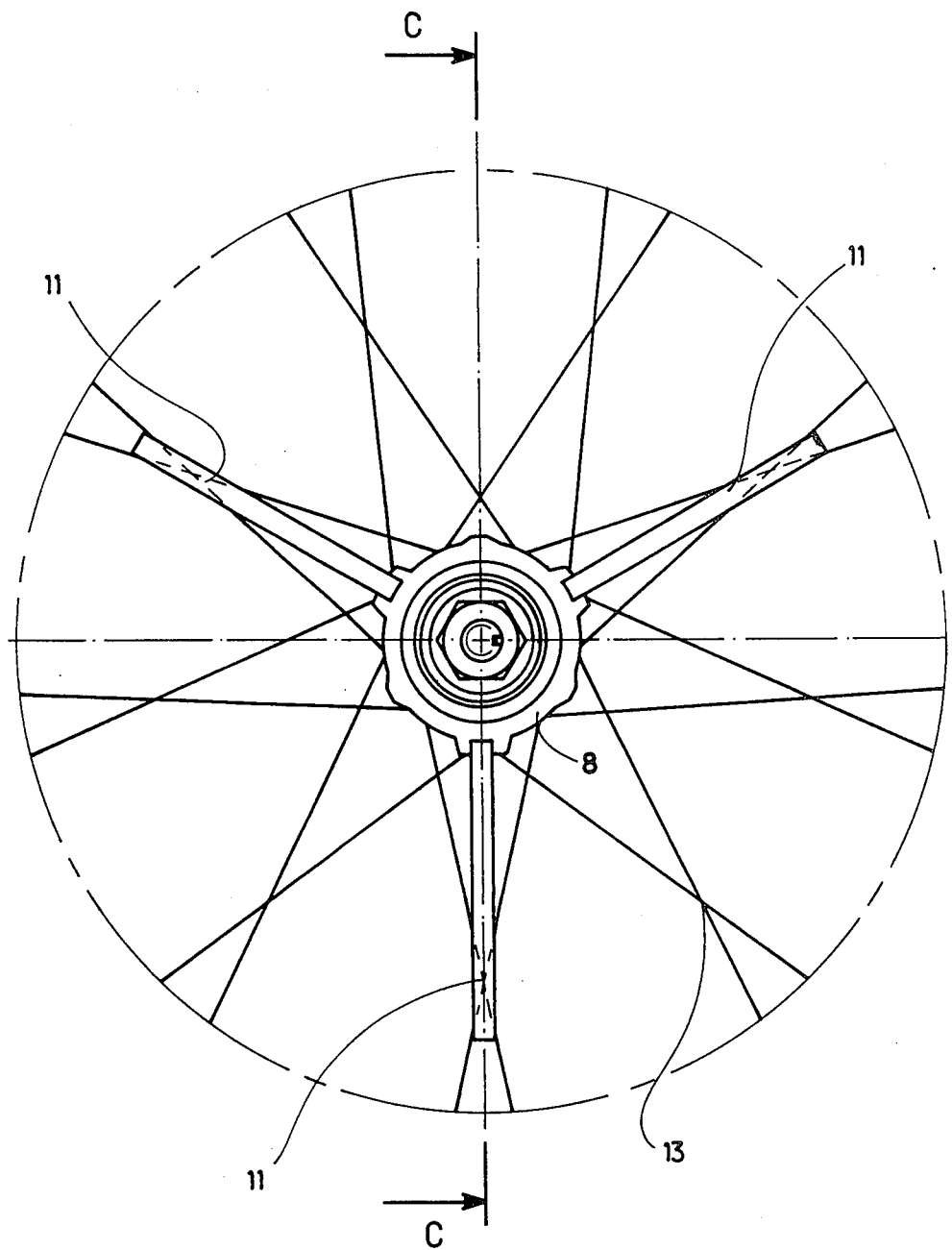
FIG. 5 is a side view of the driving wheel of FIGS. 3 and 4 fitted to a cycle wheel.

The object of the present invention is to provide a driving wheel for cycle speedometers which can be fitted rapidly on the block of a wheel hub, no matter what the dimensions of said block and without it being necessary to provide special fixing means on said block.

A further object of the invention is to ensure a fixing of the driving wheel without the fixing means increasing the assembly thickness of the cycle wheel and the speedometer driving wheel, which is to be located between the arms of the cycle fork.

According to the invention, this driving wheel comprises an annular part 1 peripherally provided with a groove 2 which serves to receive the endless belt in the form of a wire.

This annular part is also peripherally provided with hooks 3 laterally offset with respect to annular part 1 in such a way that it is possible to clip them onto the periphery of the wheel hub block.

In order to permit said clipping, the hooks 3 are made from a semi-rigid material and preferably the wheel-hooks assembly is made in one piece by moulding a plastics material.

According to the embodiment of FIGS. 1 and 2, these hooks are arranged in six groups $3_1$, $3_2$, $3_3$, $3_4$, $3_5$ and $3_6$, each defining a circle coaxial to the axle 4 of wheel 1.

In each group, the hooks made at the end of tongues 5 are regularly distributed in such a way as to permit a balanced hooking to the periphery of the wheel hub block.

Moreover, in view of the fact that the hooks are made from a semi-rigid material and, in particular, a plastics material, certain of them can be broken or at least deformed in order to render inoperative the hooks of the group of groups of hooks which are arranged closer to the centre 4 of the wheel than those which are to be used for fixing the driving wheel to the periphery of the block of the cycle wheel in question.

Thus, the choice of hooks to be retained is dictated by the diameter of the wheel hub block, so that, for example, hooks $3_1$ (see FIG. 2) are used in the case of a block 6 and hooks $3_5$ in the case of a block 7.

It should also be noted that this fixing of the driving wheel 1 to the hub block does not increase the thus obtained fitting thickness, in view of the fact that the fixing means constituted by hooks 3 are directed towards the inside of the hub.

Furthermore, in place of fitting hooks 3 on the periphery of the block, certain of them could be fixed to the wheel spokes in the case where the positioning of none of these hooks corresponds to the block diameter.

According to the embodiment of FIGS. 3 to 6, the annular part 8, constituting the actual driving wheel and which is provided with the peripheral groove 9, has two types of hooks made from semi-rigid material. One of these types comprises hooks 10 which have been moulded in one piece with annular part 8 using a semi-rigid material and in particular a plastics material.

The other type comprises thin, semi-rigid and preferably metallic sheets 11, which are attached in slots 12 regularly distributed round the periphery of annular part 8. Thus, sheets 11 are disposed radially and can be bent by their outer end level with the intersection 13 of two spokes of the wheel.

This arrangement makes it possible to obtain an assembly of the driving wheel on the cycle wheel, no matter what the hub diameter and when the positioning of hooks 10 does not correspond to the diameter of the block of said hub.

The semi-rigid metal constituting the sheets 11 is preferably an easily workable metal and in particular aluminium.

It will be appreciated that the driving wheel of the invention may suitably engage a cyclometer (distance counter) in lieu of or in addition to a speedometer. Therefore, the invention is not intended to be limited in use to driving a speedometer but is intended to embrace application to cyclometers as well as speedometers and equivalent speed and distance measuring devices.

I claim:

1. A cycle speedometer driving wheel for attachment to a cycle wheel hub block comprising means for engaging a drive belt adapted to be connected to a speedometer and means including a plurality of resilient fingers for engaging said cycle wheel hub block in fixed relation and for rotation with said wheel hub block, and means rigidly interengaging said means for engaging said drive belt and said means including a plurality of fingers whereby rotation of said cycle wheel block will cause a corresponding rotation of said last mentioned means.

2. A cycle speedometer driving wheel as set forth in claim 1 wherein said means for engaging a drive belt comprises an annular ring whose circumferential edge has a groove adapted to engage said drive belt.

3. A cycle speedometer driving wheel as set forth in claim 1 wherein said means including a plurality of resilient fingers comprises a radially arranged array of fingers having a hook configuration adapted to engage the peripheral edge of the wheel block.

4. A cycle speedometer driving wheel for attachment to a wheel block of a cycle wheel in accordance with claim 1 wherein said means including a plurality of resilient fingers comprises a plurality of sets adapted to engage different size wheel blocks.

5. A cycle speedometer driving wheel as set forth in claim 4 wherein said sets of means including a plurality of resilient fingers are positioned concentric with one another.

6. A cycle speedometer driving wheel for attachment to the periphery of a cycle wheel hub block, said driving wheel having an annular ring whose circumferential edge is adapted to engage a drive belt, said drive belt adapted to rigidly interengage said cycle wheel and speedometer, and means in fixed relation to said annular ring including a plurality of resilient fingers for snapping over and engaging the periphery of said cycle wheel hub block and for rotation with said wheel so that rotation of said cycle wheel hub block causes a corresponding rotation of said drive belt, said resilient fingers each having bight and shank portions lying in a plane substantially normal to and intersected by a radius of said driving wheel.

7. A cycle speedometer as in claim 6 wherein the circumferential edge of said annular ring has a groove adapted to engage said drive belt.

8. A cycle speedometer driving wheel for attachment to a wheel hub block of a cycle in accordance with claim 6 wherein said means including a plurality of resilient fingers comprises a plurality of sets of resilient fingers in concentric balanced arrangement to one another, said sets adapted to engage different size wheel hub blocks, and permit balanced hooking of said fingers to the periphery of the cycle wheel hub block.

9. A cycle speedometer driving wheel for attachment to a wheel hub block of a cycle as set forth in claim 8 wherein said sets of resilient fingers positioned in concentric balance arrangement to one another and adapted to engage different size wheel blocks are of hook configuration, said fingers attached to one face of said annular ring.

* * * * *